United States Patent [19]

Sims et al.

[11] Patent Number: 4,774,471

[45] Date of Patent: Sep. 27, 1988

[54] COMPLEX DIELECTRIC CONSTANT WELL LOGGING MEANS AND METHOD FOR DETERMINING THE WATER SATURATION AND THE WATER RESISTIVITY OF AN EARTH FORMATION

[75] Inventors: Jackie C. Sims; Percy T. Cox; Richard S. Simpson, all of Houston, Tex.

[73] Assignee: Texaco Inc., White Plains, N.Y.

[21] Appl. No.: 929,871

[22] Filed: Nov. 13, 1986

[51] Int. Cl.$^4$ ............................ G01V 3/10; G01V 3/18
[52] U.S. Cl. ..................................... 324/341; 324/338
[58] Field of Search ............... 324/338, 339, 341, 332, 324/333, 323

[56] References Cited

U.S. PATENT DOCUMENTS

| 3,551,797 | 12/1970 | Gouilloud et al. | 324/338 |
|---|---|---|---|
| 4,009,434 | 2/1977 | McKinlay et al. | 324/339 |
| 4,185,165 | 6/1979 | Coates | 324/338 |

Primary Examiner—Reinhard J. Eisenzopf
Assistant Examiner—Walter E. Snow
Attorney, Agent, or Firm—Robert A. Kulason; James J. O'Loughlin; Ronald G. Gillespie

[57] ABSTRACT

A well logging system and method for determining the water saturation of an earth formation and the resistivity of the water using complex dielectric constant and formation porosity measurements. Electromagnetic energy is transmitted into the earth formation from a borehole at a frequency lying within the range of frequencies from 10 MHz to 200 MHz. Electromagnetic energies are received at two locations in the borehole. A complex dielectric constant is derived from the received electromagnetic energies. The water resistivity and the water saturation of the earth formation is derived in accordance with the porosity of the earth formation and with the real and imaginary parts of the derived complex dielectric constant.

8 Claims, 2 Drawing Sheets

REAL DIELECTRIC CONSTANT & CORE ANALYSIS

COMPLEX DIELECTRIC CONSTANT & CORE ANALYSIS

COMPLEX DIELECTRIC CONSTANT WELL LOGGING MEANS AND METHOD FOR DETERMINING THE WATER SATURATION AND THE WATER RESISTIVITY OF AN EARTH FORMATION

BACKGROUND OF THE INVENTION

Field of the Invention

The present invention relates to well logging means and methods in general and, more particularly, to electrical well logging means and methods.

SUMMARY OF THE INVENTION

A well logging system and method for determining the water saturation of an earth formation and the resistivity of the water using complex dielectric constant and formation porosity measurements. Electromagnetic energy is transmitted into the earth formation from a borehole at a frequency lying within the range of frequencies from 10 MHz to 200 MHz. Electromagnetic energies are received at two locations in the borehole. A complex dielectric constant is derived from the received electromagnetic energies. The water resistivity and the water saturation of the earth formation is derived in accordance with the porosity of the earth formation and with the real and imaginary parts of the derived complex dielectric constant.

The objects and advantages of the invention will appear more fully hereinafter from a consideration of the detailed description which follows, taken together with the accompanying drawings where one embodiment is illustrated by way of example. It should be expressly understood, however, that the drawings are for illustration purposes only and are not to be construed as defining the limits of the invention.

DESCRIPTION OF THE INVENTION

Figure 1:
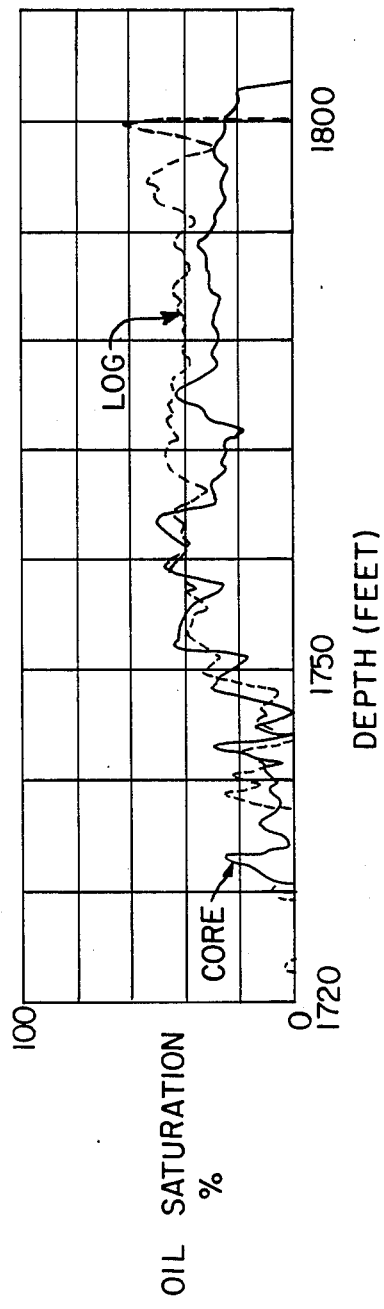
FIG. 1 is a graphical representation of the conventional derived real dielectric constant versus a core analysis of a formation.

Electrical logging tools for fresh formations operating below 10 MHz usually are used to measure only formation resistivity and those operating above 200 MHz usually are used to measure only dielectric constant. The reason for this is that the resistivity term dominates the reactive term below 10 MHz and similarly the reactive term dominates the resistivity term above 200 MHz. In the frequency range 10–200 MHz the two terms are of comparable size and can be used together to obtain a better estimate of oil saturation than would result from either used alone.

The complex dielectric constant interpretation method described herein is a technique for achieving this goal using data which can be obtained using a Texaco Dielectric Logging Tool covered under U.S. Pat. No. 4,107,598 (Meador et al), which is hereby incorporated in this application as modified as hereinafter disclosed. The system of the incorporated patent is a one transmitter coil-two receiver coil system using the ratio of amplitude of the received energies and the phase difference between the received energies to derive the dielectric constant and resistivity. The technique is most easily applied to clean formations, but it is also applicable to shaly formations.

The complex dielectric constant interpretation method is based upon a volumetric weighting of the complex dielectric constants of the formation components which can be expressed mathematically as $$\epsilon_l^{*e} = (1-\phi)\epsilon_m^{*e} + \phi(1-S_w)(1-S_s)\epsilon_h^{*e} + \phi S_w(1-S_s)\epsilon_w^{*e} + \phi S_s \epsilon_s^{*e} \quad (1)$$

where e is the exponent, $\epsilon_i^*$ is the complex dielectric constant, $K_i + jC_i$, $K_i$ is the dielectric constant where the subscript "i" can be "l" for log, "m" for matrix, "h" for hydrocarbon, "w" for water, or "s" for shale. $C_i$ is the $1/(2\pi f \epsilon_o R_i)$ where the subscript "i" can be specialized as for $K_i$, $\epsilon_o$ is the permittivity of free space, $\phi$ is porosity, $S_w$ is the water saturation, $S_s$ is the shale fraction of porosity, f is the frequency, and R is the resistivity.

When the real and imaginary parts of each side of (1) are equated two equations result which can be expressed as $$K_{ls} = (1-\phi)K_m^e + \phi(1-S_w)(1-S_s)K_h^e + \phi S_w(1-S_s)K_{ws} + \phi S_s K_{ss} \quad (2)$$

$$C_{ls} = \phi S_w(1-S_s)C_{ws} + \phi S_s C_{ss} \quad (3)$$

where $$K_{is} = (K_i^2 + C_i^2)^{e/2} \cos(e \tan^{-1} C_i/K_i) \quad (4)$$

$$C_{is} = (K_i^2 + C_i^2)^{e/2} \sin(e \tan^{-1} C_i/K_i) \quad (5)$$

Equations (2) and (3) are simultaneous equations with $S_w$ as one dependent variable and with $R_w$, e, $S_s$, $R_s$, and $K_s$ as either the other dependent variable or independent variables. These equations are the basis of the technique as can be shown with the following cases:

Case I. If the formation is clean $S_s$ is zero and $R_s$ and $K_s$ are not defined. If e is given a typical value of 0.5, $S_w$ and $R_w$ can be obtained from (2) and (3).

Case II. If the formation is shaly $S_s$, $R_s$, and $K_s$ are obtained from core analysis or other logs. If e is given a typical value of 0.5, $S_w$ and $R_w$ can be obtained from (2) and (3).

Case III. If the formation is shaly an approximate solution can be obtained by not using the shale term, i.e., the last term in (1) and the factor $(1-S_s)$ in the second and third terms of (1), and letting a modified value of $R_w$ account for the shale effect as a change in resistivity. Then, $S_w$ and e can be obtained from (2) and (3).

Figure 2:
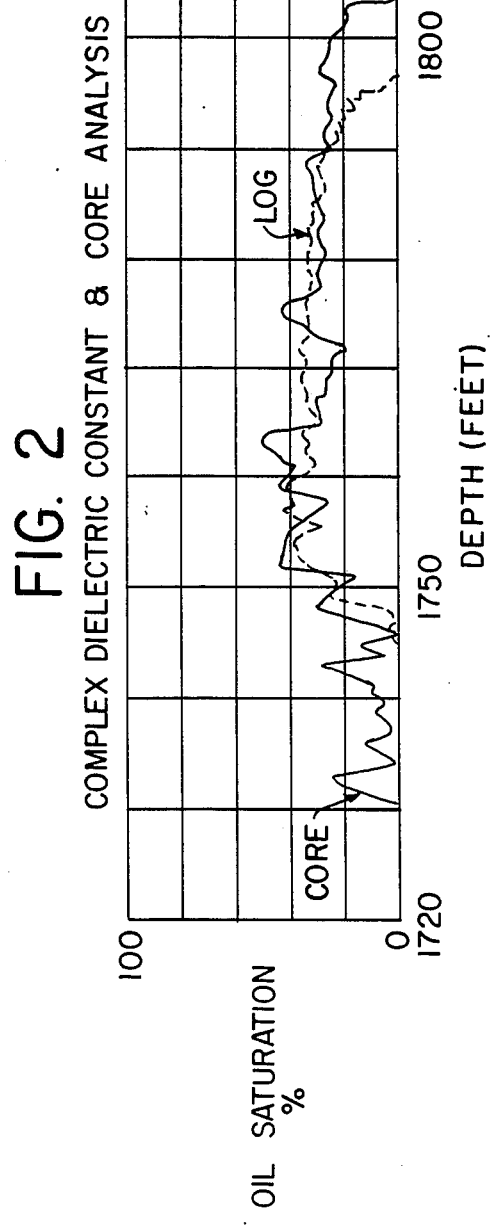
FIG. 2 is a graphical representation of the complex dielectric constant derived in accordance with the present invention versus the core analysis of the formation.

An example of the interpretation of actual field logs is shown in the FIGS. 1 and 2. FIG. 1, real dielectric constant and core analysis plot, shows a comparison of log and core derived oil saturation with a conventional dielectric measurement alone. FIG. 2, complex dielectric constant and core analysis plot, shows a comparison with the oil saturation based upon the complex dielectric constant technique with the oil saturation derived from a core.

Figure 3:
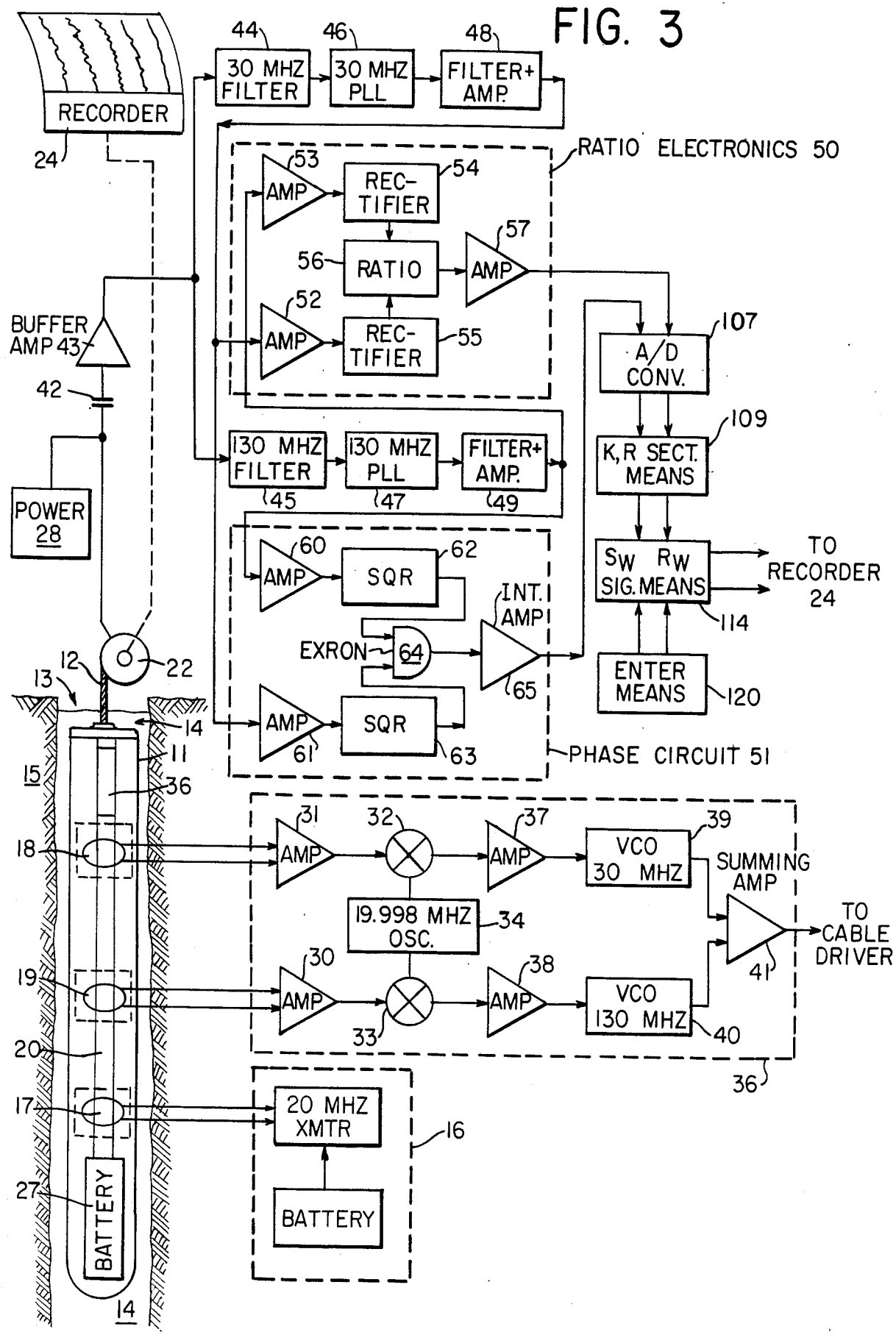
FIG. 3 is a simplified block diagram of a dielectric well logging system constructed in accordance with the present invention.

As noted previously, U.S. Pat. No. 4,107,598 has been incorporated by reference. FIG. 3 shows the schematic of that patent as modified to practice the present invention. All elements with identification numbers less than one hundred exist in the incorporated patent and function and operate in the same manner except that the transmitting frequency is 20 MHz in lieu of 30 MHz and that oscillator 34 frequency is 19.998 MHz instead of 30.0016 MHz. Suffice it to say that amplifier 57 and integrating amplifier 65 provides signals corresponding to the amplitude ratio and the phase difference, respectively, of the energy received by receiver coils 18 and 19. The signals provided by amplifier 57 and integrating amplifier 65 are provided to analog-to-digital converter 107 which provides corresponding digital signals to a K, R section means 109.

K, R section means 109 is a look-up memory stored with values of K and R and utilizes the amplitude ratio signal and the phase difference signal to select values for K and R. Signals from K, R section means 109 are provided to $S_w$, $R_w$ signal means 114. $S_w$, $R_w$ signal means 114 may be a microcomputer which utilizes the signals representing K and R to solve equations 2 and 3 simultaneously for $S_w$ and $R_w$. $S_w$, $R_w$ signal means may also be a look-up memory with values of $S_w$ and $R_w$ derived from equations 2 and 3 and uses the K and R signals along with the porosity signals to determine the proper $S_w$ and $R_w$ signals. Enter means 120 is used to provide the predetermined porosity signals. $S_w$ and $R_w$ signal means 114 provides the $S_w$ signal and $R_w$ signal to recorder 24.

What is claimed is:

1. A well logging method for determining the water saturation of an earth formation and the resistivity of the water comprising the steps of:
   obtaining the porosity of the earth formation,
   transmitting electromagnetic energy at a frequency lying within a range of frequencies from 10 MHz to 200 MHz into the earth formation from a borehole traversing the earth formation,
   receiving electromagnetic energies at two locations in the borehole from the earth formation,
   deriving a complex dielectric constant from the received electromagnetic energies, and
   deriving the water resistivity and the water saturation of the earth formation in accordance with the porosity of the earth formation and with the real and imaginary parts of the derived complex dielectric constant.

2. A well logging method as described in claim 1 in which deriving a complex dielectric constant step includes:
   deriving an amplitude ratio from the received electromagnetic energies, and
   deriving the phase difference between the received electromagnetic energies.

3. A method as described in claim 2 in which deriving the complex dielectric constant step includes deriving K values and R values in accordance with the derived amplitude ratio and the derived phase difference.

4. A method as described in claim 3 in which the water resistivity and the water saturation deriving step includes:
   deriving the water resistivity and the water saturation of the earth formation in accordance with the porosity of the earth formation and the derived K and R values.

5. A well logging system for determining the water saturation of an earth formation and the resistivity of the water comprising:
   means for transmitting electromagnetic energy at a frequency lying within a range of frequencies from 10 MHz to 200 MHz into the earth formation from a borehole traversing the earth formation,
   means for receiving electromagnetic energies at two locations in the borehole from the earth formation,
   means for deriving a complex dielectric constant from the received electromagnetic energies, and
   means for deriving the water resistivity and the water saturation of the earth formation in accordance with a predetermined porosity of the earth formation and with the real and imaginary parts of the derived complex dielectric constant.

6. A well logging system as described in claim 5 in which the complex dielectric constant deriving means includes:
   means for deriving an amplitude ratio from the received electromagnetic energies, and
   means for deriving the phase difference between the received electromagnetic energies.

7. A system as described in claim 6 in which the complex dielectric constant means includes:
   means for deriving K values and R values in accordance with the derived amplitude ratio and the derived phase difference.

8. A system as described in claim 7 in which the water resistivity and the water saturation means includes:
   means for deriving the water resistivity and the water saturation of the earth formation in accordance with the predetermined porosity of the earth formation and the derived K and R values.

* * * * *